United States Patent [19]
Ng

[11] Patent Number: 6,160,329
[45] Date of Patent: Dec. 12, 2000

[54] MINIATURE ELECTRIC MOTOR

[75] Inventor: Martin Ng, Kowloon, The Hong Kong Special Administrative Region of the People's Republic of China

[73] Assignee: Johnson Electric S.A., La Chaux-de-Fonds, Switzerland

[21] Appl. No.: 09/455,787

[22] Filed: Dec. 7, 1999

[30]     Foreign Application Priority Data

Dec. 9, 1998  [GB]  United Kingdom .................... 9826912

[51] Int. Cl.$^7$ ................................................. H02K 11/00
[52] U.S. Cl. ...................................... 310/40 MM; 310/71
[58] Field of Search ............................... 310/40 MM, 71, 310/68 R

[56]               References Cited

U.S. PATENT DOCUMENTS 5,343,102  8/1994  Mabuchi et al. ........................ 310/71
  5,939,812  8/1999  Wetzel .................................... 310/245

FOREIGN PATENT DOCUMENTS 2013042  8/1979  United Kingdom .
  2196188  4/1988  United Kingdom .

*Primary Examiner*—Nestor Ramirez
*Assistant Examiner*—Guillermo Perez
*Attorney, Agent, or Firm*—Birch, Stewart, Kolasch & Birch, LLP

[57]               ABSTRACT

A miniature electric motor has an earth strap 56 connecting one terminal 42 to a steel end plate 28. An insulating holder 40 is fixed to the end plate 28 by posts 52. The terminal 42 is supported by the holder 40 by being pressed into a passageway 48 in a boss 50 of the holder. The passageway 48 has a longitudinal groove 68 for receiving an end of the earth strap 56 which makes resilient contact with the terminal 42. The other end of the earth strap 56 is resiliently deformed between the holder 40 and the end plate 28 to establish an electrical connection between the terminal and the end plate. The end plate is in electrical contact with the casing of the motor by crimping the end of the casing over the edge of the end plate to close the casing.

6 Claims, 2 Drawing Sheets

MINIATURE ELECTRIC MOTOR

FIELD OF THE INVENTION

This invention relates to miniature electric motors and in particular, to an arrangement for connecting one terminal of the motor to a housing of the motor, thereby earthing that terminal.

BACKGROUND

It is desirable and known, in certain applications, to connect one terminal of a miniature permanent magnet d.c. motor to the motor's housing or casing. One such application is in small battery operated devices such as a shaver or hand held personal fan where one of the spring contacts, for the battery also contacts the motor casing, eliminating the need for a wire and a connector to connect the battery to one terminal. The other terminal is connected to the other battery contact by a wire and connector via a switch or other motor control device. Thus this arrangement, by eliminating one wire and connector, represents a significant saving in the overall cost of the device.

One known method of connecting the terminal to the casing is by a small strip of conductive sheet metal, usually brass, being spot welded to the terminal and the casing. The advantage of this is that the earth strap is added after the motor has been completely assembled allowing stocks of motors to be produced for various applications and only earthed for specific applications once known or ordered. Another advantage is that the earth strap can be easily seen and thus any missing straps are readily identified and rejected during visual inspection. A disadvantage is that the spot welding of the earth strap can only be done once the motor has been assembled, and there is a danger of the welding current affecting the magnets fitted inside the motor casing. Also, the spot welding is relatively weak and as the earth strap is on the outside of the casing, it is subject to knocks during shipping and assembly which could crack the spot weld joint creating a bad or weak electrical contact leading to a defective device. Such bad joints are difficult to spot visually unless the joint is completely broken, in which case the strap may be missing altogether.

Today's trend to avoid stockpiling of motors, as highlighted by the "just-in-time" manufacturing methodology, means that the advantage of post assembly addition of the earth strap is no longer a real advantage.

Thus, it is an object of the present invention to provide a motor with an earth strap which is readily identified by visual inspection, but is unlikely to be dislodged or damaged by rough handling during shipping or fitting into an appliance.

SUMMARY OF THE INVENTION

Accordingly, the present invention, in one aspect thereof, provides a miniature electric motor having: a conductive casing having an open end and a closed end; a permanent magnet stator fitted to the casing; a wound rotor disposed in working relationship with the stator, the rotor having a shaft, a rotor core mounted on the shaft, a commutator mounted on the shaft adjacent one end of the rotor core and rotor windings wound about the rotor core and terminated on the commutator; a conductive end plate closing the open end of the casing and being in intimate electrical contact therewith; brush gear comprising an insulating material holder supporting first and second motor terminals and a pair of brushes electrically connected to the motor terminals and arranged to make sliding contact with the commutator, the holder being fixed to the end plate; and an earth strap electrically connecting one of the motor terminals to the casing characterised in that the earth strap is a resilient conductive strip which makes contact with an inner surface of the end plate, passes through an opening in the end plate to be visible externally of the motor and contacts the first motor terminal.

This arrangement provides an earth strap which is protected from damage due to rough handling and yet provides rapid visual confirmation of its presence as well as clearly indicating which terminal is earthed.

Preferably, the motor terminals are supported by passageways in bosses on the holder, the bosses extending through openings in the end plate, and the earth strap is disposed within the passageway supporting the first terminal to make electrical contact with the first terminal.

Preferably, the passageway supporting the first terminal has a groove for accommodating the earth strap and the earth strap has a terminal contact portion shaped to make resilient contact with the first terminal.

Preferably, the earth strap extends into a recess in the holder forming a space between the holder and the inner surface of the end plate and is resiliently deformed therein by contact with the end plate.

In this way, the earth strap is held in resilient electrical contact with the terminal and the end plate eliminating the possibility of affecting the magnetic stator by the electrical current or heat generated by spot welding of the earth strap to the casing.

BRIEF DESCRIPTION OF THE DRAWINGS

One embodiment of the invention will now be described, by way of example only, in which.

DETAILED DESCRIPTION OF THE PREFERRED EMBODIMENT

Figure 1:
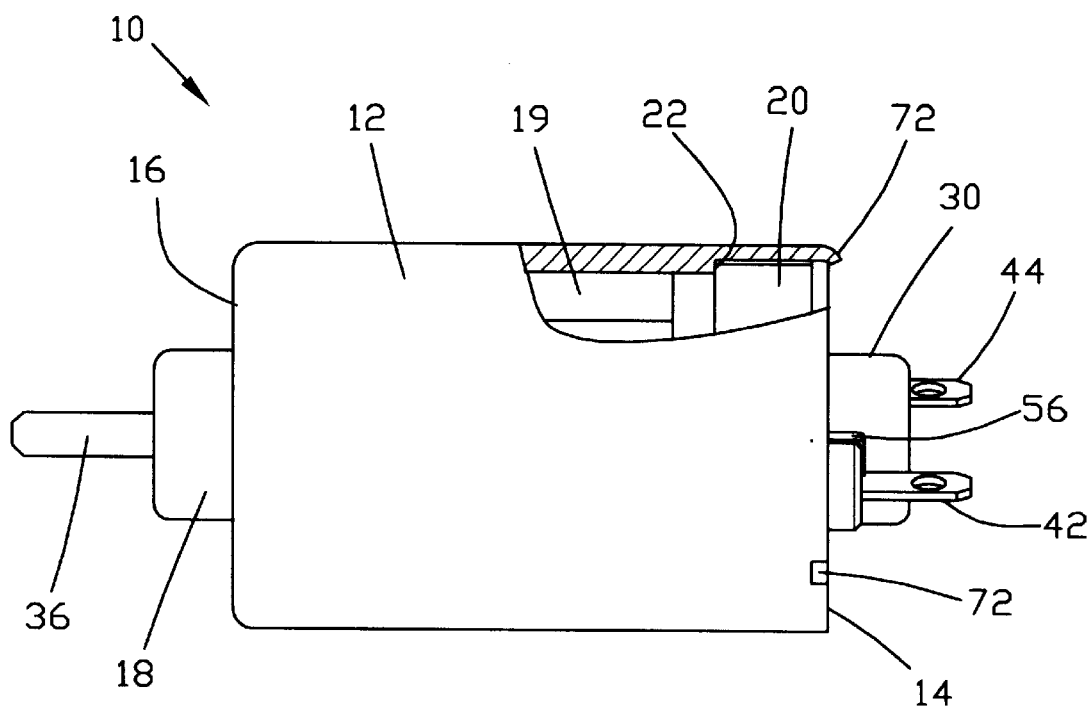
FIG. 1 illustrates a miniature electric motor according to the preferred embodiment of the present invention.

The motor of FIG. 1 is a miniature permanent magnet d.c. motor 10 having a drawn steel casing 12. The casing 12 is formed with an open end 14 and a closed end 16. The closed end 16 houses a sleeve bushing (not shown) within a drawn recess forming a bearing retainer 18. A permanent magnet stator is fitted to the inner surface of the casing wall in the usual manner and comprises two segment ceramic magnets 19. The open end 14 of the casing 12 is closed by an end cap 20. The end cap 20 is of a two part construction and is seated on a step 22 formed in the wall of the casing 12.

Figure 2:
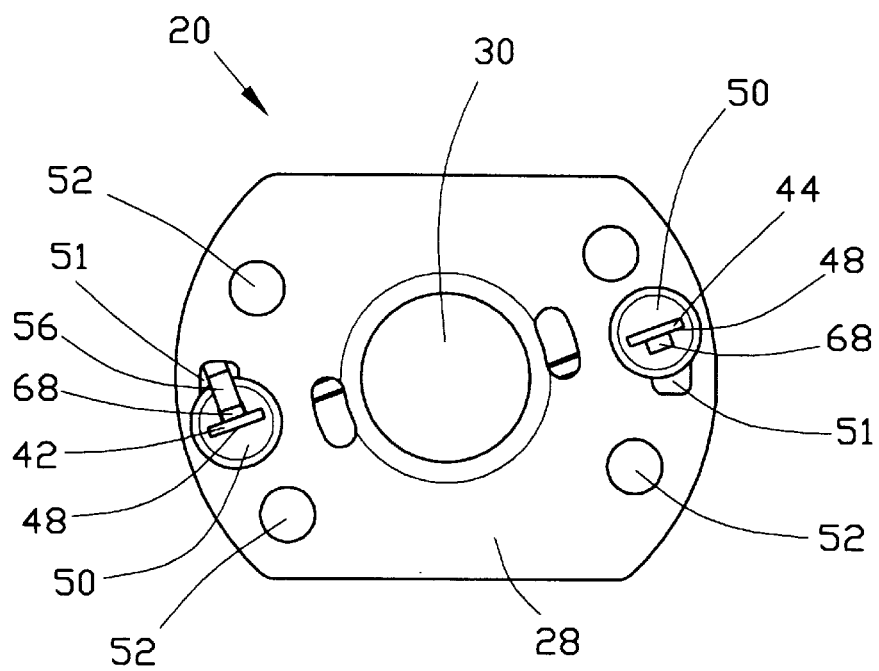
FIG. 2 is an outside end view of an end cap of the motor of FIG. 1.
Figure 3:
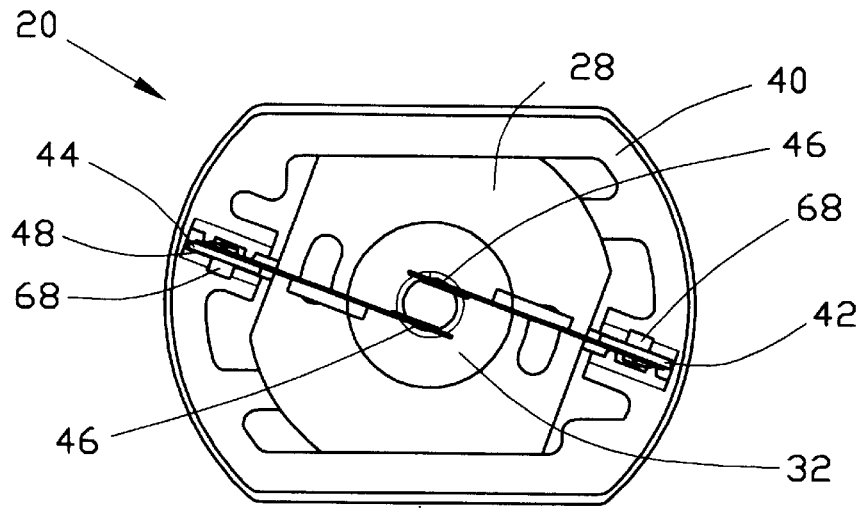
FIG. 3 is an inside end view of the end cap of FIG. 2.
Figure 4:
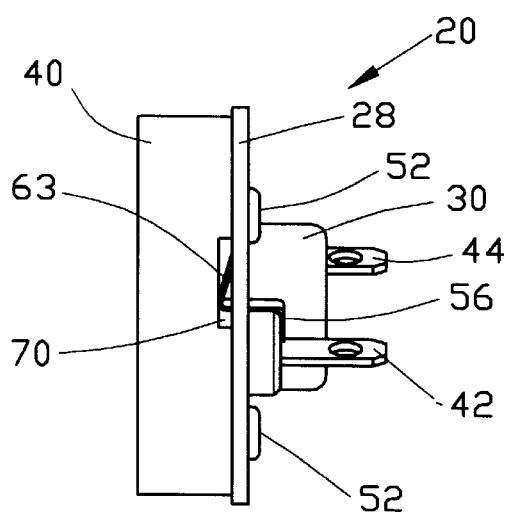
FIG. 4 is a side view of the end cap.
Figure 5:
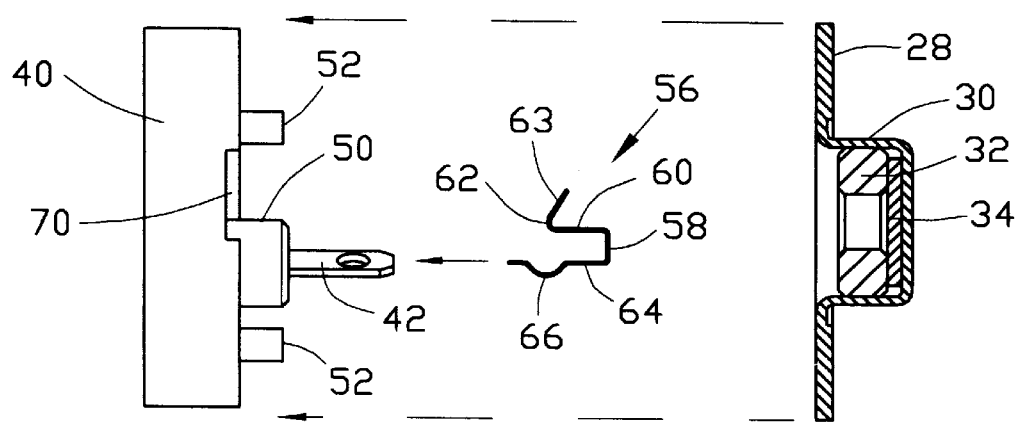
FIG. 5 is a partially exploded side view of the end cap.

FIGS. 2, 3 and 4 show the end cap 20 separately and FIG. 5 shows a partially exploded view of the end cap 20 showing the two parts separated prior to assembly.

The first part of the end cap 20 is a conductive end plate 28. The end plate 28 is a steel sheet with a drawn recess in the centre forming a bearing retainer 30 for a sleeve bearing 32 (see FIG. 5) and a thrust plate 34 (see FIG. 5 also). The bearings of the end plate 28 and of the casing 12 support a wound rotor including a commutator, of which only a shaft 36 is visible in FIG. 1. The second part of the end cap is an insulating holder 40 of nylon resin. The holder 40 supports two motor terminals 42, 44 and their associated fingerleaf brushes 46. The brushes 46 are connected to the terminals 42, 44 by upset riveting. The terminals 42, 44 are fixed to the holder 40 by being pressed into passageways 48 formed in the holder 40. On the inner side of the holder 40, as shown in FIG. 2, the brushes 46 extend from the terminals 42, 44 in a generally radially inward direction so as to make sliding contact with the commutator. On the outer side of the holder 40, as shown in FIG. 2, the passageways 48 extend through respective bosses 50. The bosses 50 extend through apertures 51 in the end plate 28 to insulate the terminals 42, 44 from the end plate 28.

The end plate 28 and the holder 40 are held together by four posts 52 formed on the holder 40 which pass through holes in the end plate 28 before being staked or plastically deformed to fix the two parts 28, 40 together.

An earth strap 56 formed from a strip of brass connects a first motor terminal 42 to the end plate 28. The earth strap 56 has a U-shaped portion 58. One leg 60 of the U-shaped portion 58 is bent back to form a V-shaped portion 62, having a free arm 63, for making contact with the end plate 28. The other leg 64 of the U-shaped portion 58 has a convex portion 66 forming a terminal contact portion.

The passageways 48 holding the terminals 42, 44 each have a longitudinal groove 68 and the other leg 64 of the earth strap 56 is pressed into this groove 68 next to the first terminal 42 such that the convex portion 66 is resiliently deformed by the terminal 42. The U-shaped portion 58 of the strap 56 straddles a part of the boss 50. Next to the base of the boss 50 is a recess 70 formed in the outer side of the holder 40. The apex of the V-shaped portion 62 extends into this recess 70 with the free arm 63 projecting outwardly in its natural state. On fitting the end plate 28 to the holder 40, the recess 70 forms a space between the holder 40 and the end plate 28 while the end plate 28 contacts and resiliently deforms the free arm 63 of the V-shaped portion 62 of the earth strap 56 as shown in FIG. 4. Thus, resilient electrical contact is established between the first terminal 42 and the end plate 28 without soldering, welding or screwing while providing rapid visual inspection of the presence of the earth strap which is protected from damage during handling and fitting into an appliance.

Electrical contact between the end plate 28 and the casing 12 is established when the end cap 20 is fitted to the casing 12 and retained there by crimping the end of the casing 12 to the end plate 28, as shown generally at 72 in FIG. 1.

I claim:
1. A miniature electric motor comprising:
   a conductive casing having an open end and a closed end;
   a permanent magnet stator fitted to the casing;
   a wound rotor disposed in working relationship with the stator, the rotor having a shaft, a rotor core mounted on the shaft, a commutator mounted on the shaft adjacent one end of the rotor core and rotor windings wound about the rotor core and terminated on the commutator;
   a conductive end plate closing the open end of the casing and being in intimate electrical contact therewith;
   brush gear comprising an insulating material holder supporting first and second motor terminals and a pair of brushes electrically connected to the motor terminals and arranged to make sliding contact with the commutator, the holder being fixed to the end plate; and
   an earth strap electrically connecting one of the motor terminals to the casing,
   wherein the earth strap is a resilient conductive strip which makes contact with an inner surface of the end plate, passes through an opening in the end plate to be visible externally of the motor and contacts the first motor terminal.

2. The motor according to claim 1, wherein the motor terminals are supported by passageways in bosses on the holder, the bosses extending through openings in the end plate, and
   the earth strap is disposed within the passageway supporting the first terminal to make electrical contact with the first terminal.

3. The motor according to claim 2, wherein the passageway supporting the first terminal has a groove for accommodating the earth strap and the earth strap has a terminal contact portion shaped to make resilient contact with the first terminal.

4. The motor according to claim 3, wherein the terminal contact portion is a convex portion formed in an otherwise flat portion of the earth strap.

5. The motor according to claim 2, wherein the earth strap has a U-shaped portion which accommodates part of the boss of the first terminal.

6. The motor according to claim 1, wherein
   the earth strap extends into a recess in the holder forming a space between the holder and the inner surface of the end plate and is resiliently deformed therein by contact with the end plate.

* * * * *